United States Patent
Aydin et al.

(10) Patent No.: US 9,414,396 B2
(45) Date of Patent: Aug. 9, 2016

(54) APPARATUS, BASE STATION TRANSCEIVER, METHOD, AND COMPUTER PROGRAM FOR ASSIGNING A RADIO RESOURCE

(71) Applicant: Alcatel Lucent, Boulogne Billancourt (FR)

(72) Inventors: Osman Aydin, Stuttgart (DE); Uwe Doetsch, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/408,791

(22) PCT Filed: May 24, 2013

(86) PCT No.: PCT/EP2013/060744
§ 371 (c)(1),
(2) Date: Dec. 17, 2014

(87) PCT Pub. No.: WO2013/189688
PCT Pub. Date: Dec. 27, 2013

(65) Prior Publication Data
US 2015/0141032 A1 May 21, 2015

(30) Foreign Application Priority Data
Jun. 21, 2012 (EP) .................................... 12305708

(51) Int. Cl.
*H04W 72/08* (2009.01)
*H04W 72/12* (2009.01)
(Continued)

(52) U.S. Cl.
CPC ........ *H04W 72/085* (2013.01); *H04W 72/0486* (2013.01); *H04W 72/1226* (2013.01); *H04W 72/1252* (2013.01); *H04W 72/1257* (2013.01); *H04W 88/10* (2013.01)

(58) Field of Classification Search
CPC ... H04W 88/10; H04W 8/04; H04W 72/1226; H04W 72/085; H04W 72/0486; H04W 72/1251; H04W 72/0446; H04W 72/005
USPC ............ 455/452.2, 435.1; 370/315, 342, 330, 370/329
See application file for complete search history.

(56) References Cited

U.S. PATENT DOCUMENTS

2009/0154415 A1    6/2009  Park et al.
2012/0033606 A1*  2/2012  Chun ................. H04B 7/15528
                                            370/315

FOREIGN PATENT DOCUMENTS

EP    2 262 335 A1    12/2010
EP    2 493 235 A1    8/2012
(Continued)

OTHER PUBLICATIONS

International Search Report for PCT/EP2013/060744 dated Jun. 20, 2013.
(Continued)

*Primary Examiner* — Phuoc H Doan
(74) *Attorney, Agent, or Firm* — Fay Sharpe, LLP (57) ABSTRACT

Embodiments relate to an apparatus, a base station transceiver, a method, and a computer program for assigning a radio resource. An apparatus 10 for a mobile communication system is operable to assign a radio resource from a plurality of radio resources to enable communication of information between a mobile transceiver 200 and a base station transceiver 100. The apparatus 10 comprises a scheduler 12 for determining the radio resource based on information on a transmission condition between the mobile transceiver 200 and the base station transceiver 100, and based on a first allocation rule of a first operator and based on a second allocation rule of a second operator.

20 Claims, 4 Drawing Sheets (51) Int. Cl.
*H04W 72/04* (2009.01)
*H04W 88/10* (2009.01)

(56) References Cited

FOREIGN PATENT DOCUMENTS

| WO | WO 2010/111839 A1 | 10/2010 |
| WO | WO 2012/024088 A2 | 2/2012 |

OTHER PUBLICATIONS

PCT PAT App PCT/EP2013/060744, Written Opinion of the International Searching Authority, mailed Jun. 20, 2013, 5 pp.
European Pat App No. 12305708.5, Extended European Search Report, mailed Sep. 21, 2012, 6 pp.

* cited by examiner

APPARATUS, BASE STATION TRANSCEIVER, METHOD, AND COMPUTER PROGRAM FOR ASSIGNING A RADIO RESOURCE

Embodiments of the present invention relate to mobile communication systems, in particular but not exclusively to sharing of transmission resources in mobile communication systems between multiple operators.

BACKGROUND

Demands for mobile services, especially for data services, are steadily increasing. With the introduction of mobile devices such as cell phones, tablet computers, laptop or notebook computers, etc., expectations on service availability of users have been increasing. On the network operator side the capacity of mobile communication networks is increased accordingly, therefore more and more transmission points, such as base station transceivers, access points, etc., are installed. Hardware costs and installation costs are major contributors to the overall costs that arise to operators. In the wireless world, the improvement of network efficiency and the reduction of costs become more and more important. One strategy that is discussed among operators is to share the resources, i.e. multiple operators provide their services to subscribers using the same network hardware. The sharing of resources can be accomplished in different ways. One possibility is to share the infrastructure of a mobile network, respectively the base stations, such as an eNodeB (eNB), and/or the backhaul network. A further method is to share the spectrum itself, i.e. to subdivide the bandwidth in sub-bands, which are then assigned to different operators.

When multiple operators share hardware resources and/or frequency resources, strategies are needed, on how the resources, especially the radio resources, which are used by the subscribers of the operators, are shared and assigned between the operators. Especially in high load situations, i.e. when the network capabilities are almost exhausted, efficient and transparent resource assignment mechanisms are desirable.

Document US 2009/0154415 A1 provides a scheduling apparatus and method for proportional resource allocation among Mobile Virtual Network Operators (MVNOs). The method includes, for each MVNO, allocating a dedicated resource of each MVNO to Quality of Service (QoS) traffic in consideration of priorities, for each MVNO, determining a presence or absence of unscheduled QoS traffic, and for MVNOs each of which has the unscheduled QoS traffic, allocating a common resource shared by all MVNOs to the unscheduled QoS traffic in consideration of priorities without distinguishing each MVNO. Accordingly, proportional resource allocation depending on a pre-set ratio can be guaranteed, efficiency of resource use can be improved, and QoS can be guaranteed.

SUMMARY

Embodiments are based on the finding that sharing of network resources, especially hardware resources, can be realized in different ways. For example, the sharing of an eNodeB can be realized by using a virtualization of the eNodeB. That is to say that single eNodeB hardware provides a platform, which enables the implementation of multiple virtual eNodeBs. It is a further finding that in any case, whether it is simple sharing or virtualization, components of such an eNodeB can be enhanced to support more than one operator. The principle of eNodeB virtualization is that one physical eNodeB hosts two or more virtual eNodeBs. Hence, in case of an eNodeB, the internal components like the Central Processing Unit (CPU), memory or network interfaces, radio components and backhaul may be virtualized, i.e. modified for the support of virtualization. Every operator may then own a virtual eNodeB and may run its own operational software on the virtual eNodeB.

It is a further finding that the actual resource allocation, i.e. the allocation of radio resources used to communicate between a mobile transceiver and a base station transceiver in such a mobile communication network, has to be adapted when these resources are to be shared between multiple operators. For example, an eNodeB may operate a scheduler, which assigns radio resources, such as resources on control channels and data channels, such that the mobile transceiver can communicate with the eNodeB.

It is a further finding that fairness issues may arise if two or more operators are handled in one base station transceiver or eNodeB, using one spectrum. Embodiments may provide a scheduler for an eNodeB, which provide a fair distribution of radio resources where predefined conditions may be taken into account. In other words, contrary to legacy schedulers, which target is to satisfy a user's Quality of Service (QoS), regardless of the efforts spent or the use of capacity in or at the eNodeB. In embodiments schedulers may handle different business plans of operators entering the mobile market, such as ones only interested in delay requirements for the targeted gaming customers, which may not have a big interest in the provided bandwidth.

Embodiments can be based on the finding that such schedulers may have to find proper algorithms and inputs on how to combine legacy operators with new operators entering the market, for example, for gaming or Machine-to-Machine (M2M)-operators, which should all be provided with a meaningful and fair (cost) scheduling. It is a further finding that this approach could also change the roles of vendors and operators. For example, a vendor could operate a network and provide network services to one or more operators. That is to say that today's operator may only buy resources with certain QoS characteristics from the vendor. Therefore, embodiments may provide an interface for the different operators to take into account different scheduling strategies and cost functions. In the following the term cost may be considered a measure for the resource utilization which is necessary to serve a certain user with a certain service, to serve a certain user with all its services, to serve all users of an operator, etc.

It is a further finding that overload conditions in the network, for example, at an eNodeB, may be especially critical in multi-operator scenarios. Load at a base station transceiver, such as an eNodeB, may appear on different levels, such as on all (common) control channels. Examples for such control channels are the channels which indicate on which data channel an actual data transmission will take place. Embodiments may refer to mobile communication systems, which may, for example, correspond to one of the $3^{rd}$ Generation Partnership Program (3GPP)-standardized mobile communication networks, as, for example, Long-Term Evolution (LTE), an LTE-Advanced (LTE-A), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM-EDGE Radio Access Network (GERAN), generally an Orthogonal Frequency Division Multiple Access (OFDMA) network, a Time Division Multiple Access (TDMA) network, a Frequency Division Multiple Access (FDMA) network, a Spatial Division Multiple Access (SDMA) network, etc., or mobile communication networks with different standards, for example, Worldwide Inter-operability for Microwave Access (WIMAX).

The following examples may refer to an LTE or an LTE-A network. Coming back to the common control channels and referring to the example of an LTE or an LTE-A network, these control channels may correspond to a Physical Downlink Control CHannel (PDCCH), a Physical Uplink Control CHannel (PUCCH), a Random Access CHannel (RACH), a Physical Hybrid Automatic Repeat reQuest (HARQ) Indicator CHannel (PHICH), a Paging CHannel (PCH). As mentioned above, these control channels are used to organize payload data transmission on corresponding data channels, however, resources on the control channels can also be scarce. Examples for such situations will be detailed subsequently; here it is pointed out that if the control channels run out of resources, this may as well limit the system capacity as resource shortage on payload data channels.

The load of an eNodeB may also correspond to capacity utilization on data channels, such as, for example, shared data channels. Coming back to the example of an LTE or an LTE-A network, such data channels are the Physical Downlink Shared CHannel (PDSCH) and the Physical Uplink Shared CHannel (PUCCH). Moreover, the load of an eNodeB may be determined based on the utilization of its interfaces, such as the X2 interface in LTE or LTE-A. This interface is used for inter-eNodeB communication. In other words, the load of a base station transceiver or the capacity of a base station transceiver may be determined by the utilization of its radio interfaces, which can be subdivided in the utilization of data and control channels thereon, and its load may be determined by the utilization of its other interfaces, especially the interfaces to other NodeBs and to the backhaul network.

It is a further finding of embodiments that for the case of sharing/virtualization, a proper load definition may be agreed between all partners, i.e. operators, equipment builders, etc. It is a further finding that further processes, for example, in a scheduler may depend on this overload trigger.

For example, different applications may occupy different resources on shared data and signaling resources. That is to say depending on a certain characteristic of a service, for example whether it communicates a small number of large packets or a large number of small packets, the ratio between the signaling or control traffic generated by this service and the actual payload traffic generated by this service differ. As an example, for a browser application, i.e. loading a webpage, using the HyperText Transfer Protocol (HTTP) was found to take up 12% of the air interface signaling in an LTE network, while it took 70% of the network volume. This is an example pointing out that the signaling or control resources needed for this service are rather low. Another example is an e-mailing application, which was found to take up 65% of the air interface signaling and only 4% of the network volume. This is caused by an e-mail client trying to frequently update a mailbox, when most of the time, there are no new e-mails. Therefore, a high signaling traffic is generated, while the actual payload data traffic is low. These examples are used to point out that, depending on a service portfolio of different operators, their resource utilization and strategy may be different. The above examples also point out that the proper definition of an overload situation is to be provided to the scheduler in case of a multi-operator scenario.

Moreover, embodiments are based on the finding that in case of a multi-operator scenario, the influence of an overload situation on the resource allocation for a specific operator can be critical. Different operators may have different bandwidth requirements, different delay requirements, different system access times or even other requirements. It is a further finding that it is desirable to be able to consider these different requirements in a multi-operator scheduler. Moreover, in case of a multi-operator scenario, the scheduler mechanisms during an overload situation may be adapted in embodiments. For example, an eNodeB may provide enhanced mechanisms as, for example, a traceable or comprehensible resource allocation, taking into account given cost strategies and requirements. Said resource allocation strategies and requirements may even be adapted. In other words, a traceable scheduling decision may provide means to operators to refine, redirect or adapt their strategies and business plans.

Embodiments provide an apparatus for a mobile communication system being operable to assign a radio resource from a plurality of radio resources to enable communication of information between a mobile transceiver and a base station transceiver. The mobile communication system may correspond to one of the communication systems listed above. The terms "mobile communication system" and "mobile communication network" will be used synonymously herein. The term "radio resources" refers to resources that are utilized to enable a radio transmission of data between a mobile transceiver and a base station transceiver. Hence, radio resources may refer to time resources, such as radio frames, sub-frames, Time Transmission Intervals (TTI), time slots, symbols, they may correspond to frequency resources, such as carriers, sub-carriers, frequency layers, sub-bands, they may correspond to code resources, such as channelization or scrambling codes, spreading codes, they may also correspond to spatial resources, such as spatial sub-channels in a Multiple-Input-Multiple-Output (MIMO) system, certain beams in a beam forming system, etc., the radio resources may even correspond to resources, which are defined by a certain standard, such as the resources available on a control channel or a data channel. In the following a communication between the mobile transceiver and the base station transceiver may take place in the uplink, i.e. from the mobile transceiver to the base station transceiver, or in the downlink, i.e. from the base station transceiver to the mobile transceiver, or in both directions.

As it has already been mentioned above, the mobile communication system may further comprise a base station transceiver. The base station transceiver can be operable to communicate with a number of mobile transceivers. In embodiments, the mobile communication system may comprise mobile transceivers and base station transceivers, wherein a base station transceiver may establish a macro cell or a small cell, as for example a pico, metro, or a femto cell. A mobile transceiver may correspond to a smartphone, a cell phone, a laptop, a notebook, a personal computer, a Personal Digital Assistant (PDA), a Universal Serial Bus (USB)-stick, a car, etc. Reference may also be made to handheld or mobile. A mobile transceiver may also be referred to as User Equipment (UE) in line with the 3GPP terminology.

A base station transceiver can be located in the fixed or stationary part of the network or system. A base station transceiver may correspond to a Remote Radio Head (RRH), a transmission point, an access point, a macro cell, a small cell, a micro cell, a femto cell, a metro cell, etc. A base station transceiver can be a wireless interface of a wire network, which enables transmissions of radio signals to a UE or a mobile transceiver. Such a radio signal may comply with radio signals as, for example, standardized by 3GPP or, generally, in line with one or more of the systems listed above. Thus, a base station transceiver may correspond to a NodeB, an enhanced-NodeB, a Base Transceiver Station (BTS), an access point, a remote radio head, a transmission point, etc., and it can be further subdivided into a remote and a central unit. That is to say that a base station transceiver, as it is made reference to in the following, may comprise a remote unit, e.g. an RRH for transmitting and receiving radio signals, and a central unit, e.g. for processing base band signals. The remote unit may comprise antenna and amplifying circuitry and the central unit may comprise processing resources such as processors, Digital Signal Processors (DSP), multi-purpose processors, etc.

A mobile transceiver can be associated with a base station transceiver or a cell. The term cell refers to a coverage area of radio services provided by a base station transceiver, for example, a NodeB or an eNodeB, a remote radio head, a transmission point, etc. The base station transceiver may provide multiple cells on one or more frequency layers, and in some embodiments a cell may correspond to a sector. For example, sectors can be achieved using sector antennas, which provide a characteristic for covering an angular section around a remote unit or a base station transceiver. In some embodiments, a base station transceiver may, for example, operate three or six cells covering sectors of 120° (in case of three cells), 60° (in case of six cells), respectively. A base station transceiver may operate multiple sectorized antennas.

A communication between a mobile transceiver and a base station transceiver may be carried out in both directions, i.e. from the mobile transceiver to the base station transceiver, which is also referred to as the uplink direction, or from the base station transceiver to the mobile transceiver, which is also referred to as the downlink direction. In embodiments the apparatus further comprises a scheduler for determining the radio resource. Hence, the scheduler is operable to determine or allocate the radio resource that is used for the communication of the information between the mobile transceiver and the base station transceiver. Said communication may take place in one, i.e. uplink or downlink, or in both communication directions. The scheduler is operable to determine the radio resource based on information on a transmission condition between the mobile transceiver and the base station transceiver. That is to say, the condition of the network or the radio condition between the mobile transceiver and the base station transceiver is taken into account, when determining the radio resource. Furthermore, the scheduler is operable to determine the radio resource based on a first allocation rule of a first operator and based on a second allocation rule of a second operator. Hence, the scheduler is operable in a multi-operator scenario. That is to say, in embodiments a plurality of operators may share the radio resources and hence a plurality of allocation rules, i.e. one or more for each of the operators, may be taken into account. When requests for resources arrive at the scheduler, it determines a radio resource based on the allocation rule of the operator the mobile transceiver is associated with and the respective condition of the network and the mobile transceiver.

In other words, aside from the transmission condition or the network condition, allocation rules which have been set for different operators influence the scheduling decision, i.e. the allocation of radio resources. In embodiments, the determining of the radio resource can be further based on a utilization of control channel resources, i.e. based on the load situation on such a control channel. For example, a control signal may provide resources to signal to a mobile transceiver, which radio resources it shall use for payload data transmission or reception. Naturally, the resources, i.e. the number of mobile transceivers that can be signaled such transport information of payload data, is limited. If many mobile transceivers transmit small packets, then more control channel resources are needed per payload data unit than for the case when large data packets are communicated. In other scenarios, the determining of the radio resource can be further based on a utilization of a data channel resource. Similar to what was said above for the control channel, the resources on a data channel may be limited.

In other words, a data channel may only provide a maximum data rate, which corresponds to a maximum amount of data, which can be transmitted for a time interval. Therefore, the load on a data channel may influence the allocation of the radio resource. Moreover, for example, if advanced transmission concepts are used, the communication resources to other base station transceivers may be taken into account. In the example of an LTE or an LTE-A network, the NodeB may be limited by the X2 resources. For example, if CoOperative MultiPoint (COMP) transmission is used, then multiple NodeBs may transmit data to the same mobile transceiver. In order to coordinate the transmission and to synchronize the data which is transmitted, said data has to be provided through the X2 interface to a cooperating NodeB. Hence, the resources on the X2 interface may be taken into account for the allocation of the radio resource.

In further embodiments the scheduler can be operable to base the determining of the radio resource on whether the mobile transceiver is subscribed to the first operator or whether the mobile transceiver is subscribed to the second operator. That is to say that different allocation rules may be applied for the different operators. Naturally, an operator may pay for a certain amount of resources, e.g. in terms of service provision, which can be different for each operator. Therefore, especially when resources are scarce, resources may be preferably assigned to an operator, which may not have received a fair share in the past. In other words, the fairness between the operators may also be a determining factor in embodiments.

In embodiments the information to be communicated between a mobile transceiver and a base station transceiver may correspond to a control signal, which is communicated as part of a control channel established between the base station transceiver and a mobile transceiver and the control signal may comprise information related to a payload communication on a data channel. As has already been mentioned above, the control channel may indicate details on a payload data transmission on a data channel to the mobile transceiver. For example, a Transport Format Indicator (TFI) may be used to inform a mobile transceiver about a downlink transmission on a payload data channel. Similar considerations may apply to the uplink, where it may be indicated to the mobile transceiver, which resources to use on a payload data channel when transmitting payload data to the base station transceiver.

In embodiments the first and second assignment rules may determine a distribution of the radio resources between the first operator and the second operator. That is to say, the plurality of radio resources can be shared among the first operator and the second operator based on the first and second allocation rules. A very simple example is bandwidth sharing, for example, a first number of subcarriers are dedicated to a first operator and a second number of subcarriers, i.e. other subcarriers, are assigned to the second operator. Another possibility is to use different time resources, which are shared between the operators. For example, the first operator may use a certain subset of TTIs while the second operator may use another subset of TTIs. While this may be easy to implement on payload data channels, control data channels may have to be shared on a different level, as some systems would not allow having multiple control channels separated on different subcarriers. Therefore, control channel resources may be subdivided or distributed in a time multiplexing manner, i.e. some TTIs belong to the first operator and other TTIs belong to the second operator. Another option would be to relate resources for control signaling to the associated payload data amount. Therewith an association to the service or traffic characteristic of the respective operator may be obtained.

In embodiments the scheduler can be operable to determine a control cost indicator for a control channel resource related to communicating the information between the mobile transceiver and the base station transceiver based on a load situation of the base station transceiver and based on the allocation rule of the operator the mobile transceiver is associated with. Correspondingly, the scheduler can be operable to determine a data cost indicator for a data channel resource related to communicating the information between a mobile transceiver and a base station transceiver, based on a load situation of the base station transceiver and based on the allocation rule of the operator the mobile transceiver is associated with. The scheduler can be further operable to determine the radio resource based on the control cost indicator and the data cost indicator.

The cost may be represented in terms of transmission resources or radio resources and it may relate to a given load or resource utilization in the system. For example, a user in a low interference and path loss condition may require low transmission power resources and may have a low cost. A user in a high interference condition may require high transmission power resources and may have high costs. A user transmitting a large payload data packet may require low control channel costs, as the large payload data packet may require a single indication on the control channel for that user. This user may, at the same time have high data channel costs. A user transmitting a number of small data packets may utilize high control channel costs, as each of the small data packets may evoke separate signaling and may consume extra control channel resources. The control channel cost may therefore be high and the data channel cost may be low.

The scheduler can be further operable to determine the radio resource based on a cost allocation parameter of the operator the mobile transceiver is associated with; the cost parameter may indicate a desired resource utilization of the operator related to control and data costs. In other words, a cost indicator may indicate the costs, for example, in terms of a ratio of control channel resources that are used for a certain service. In a similar way, the data cost indicator may indicate the costs on a data channel, for example, in terms of a ratio of the resources used from the data channel for a certain service. As these costs may vary depending on the situation in the network and depending on the services, an operator may provide, for example, as part of an allocation rule, a cost allocation parameter determining what cost an operator is willing to accept for certain services or on which kind of channel, i.e. differentiating between control channels and data channels.

In some embodiments the scheduler can be operable to determine a radio resource allocation trace comprising information on a radio resource allocation for at least one of the operators. That is to say, the scheduler may store allocations made in the past, for example, within a certain time window. The data stored can then be evaluated by the operator and a better transparency of the scheduling decisions and the load situation and service mix in the respective cell can be provided. The radio resource allocation trace may comprise information on radio resource allocations for at least one of the operators and/or the mobile transceiver for a predetermined time period. That is to say that the radio resource allocation trace may provide separate information per operator and mobile transceiver or combined information. Moreover, the scheduler can be operable to determine a radio resource allocation trace comprising information on a radio resource allocation for at least one of the operators and/or the mobile transceiver for a predetermined time period and wherein the radio resource allocation trace comprises information on a quality of service provided to the at least one operator and/or the mobile transceiver. That is to say the information stored in the trace may allow determining a quality of service, which was provided to a mobile transceiver within a time window. The information in the trace may also allow the provision of a quality of service provided for an operator within the time window. In other words, the scheduler may provide a track of QoS per user and QoS per operator.

In further embodiments the scheduler can be operable to determine an averaging function for a resource distribution among the first operator and the second operator. The averaging function may refer to one or more elements of the group of a predetermined time window, a predetermined load, a predetermined capacity utilization on a control channel, a predetermined capacity utilization on a data channel, an average number of served mobile transceivers or a fairness level. In other words, the averaging function may contribute to achieving a certain fairness between the operators and to achieving a certain transparency for the operators for verification purposes. The averaging function may periodically check the fairness targets between the operators. In embodiments, this can for example be carried out according to an agreed and set time window which may, for example, span 1 ms or nms, where n is a positive integer. In other embodiments, said averaging function may be carried out according to agreed and set other conditions as, for example, load on the control channel, load on a data channel, number of UEs served per operator, etc.

In embodiments the first allocation rule may correspond to a quality of service indication for communication between the mobile transceiver and the base station transceiver, when the mobile transceiver is associated to the first operator. Correspondingly, the second allocation rule may correspond to a quality of service indication for communication between the mobile transceiver and the base station transceiver, when the mobile transceiver is associated to the second operator.

In further embodiments, the information on the transmission condition comprises one or more elements of the group of information on a load situation, information on a quality of service requirement of a service of the mobile transceiver, information on an interference condition, information on an inter-cell interference condition, information on an intra-cell interference condition, information on a capacity utilization of an interface to another base station transceiver, information on a capacity utilization of the plurality of radio resources, information on a capacity utilization of radio resources of a control channel, or information on a capacity utilization of radio resources of a data channel.

In other words, the scheduler may take into account during the resource allocation a set of additional parameters in order to arrive at the scheduling decision. These parameters may comprise parameters indicating interference created or received from other neighbor cells, for example, in a micro-macro cell scenario. The parameters may take into account a created scarcity of the X2 resources, a created scarcity of the control and data channels of a NodeB, the operator strategies, etc.

In further embodiments, billing information for the operators for use of resources at the base station, e.g. an eNodeB, can be provided by the scheduler. Moreover, as part of the averaging function or as separate information, performance counters may be generated per operator which may help the operator to adapt the resource allocation.

Embodiments further provide a base station transceiver comprising the apparatus described above.

Embodiments may further provide a method for a mobile communication system being operable for assigning a radio resource from a plurality of radio resources to enable communication of information between a mobile transceiver and a base station transceiver. The method comprises determining the radio resource based on information on a transmission condition between a mobile transceiver and a base station transceiver and based on a first allocation rule of a first operator and based on a second allocation rule of a second operator.

Embodiments further provide a computer program having a program code for performing one of the above methods when the computer program is executed on a computer or processor.

In further embodiments operators may change their allocation rules based on the provided information. The scheduler may then be operable to take into account changing resource allocation requirements per operator, for example, as part of changed allocation rules. The generated performance counters per operator may help the operators to adapt their resource allocation requirements according to their business plans.

Some embodiments comprise a digital control circuit installed within the apparatus for performing the method. Such a digital control circuit, e.g. a Digital Signal Processor (DSP), needs to be programmed accordingly. Hence, yet further embodiments also provide a computer program having a program code for performing embodiments of the method, when the computer program is executed on a computer or a digital processor.

BRIEF DESCRIPTION OF THE FIGURES

Some embodiments of apparatuses and/or methods will be described in the following by way of example only, and with reference to the accompanying figures, in which.

DESCRIPTION OF EMBODIMENTS

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
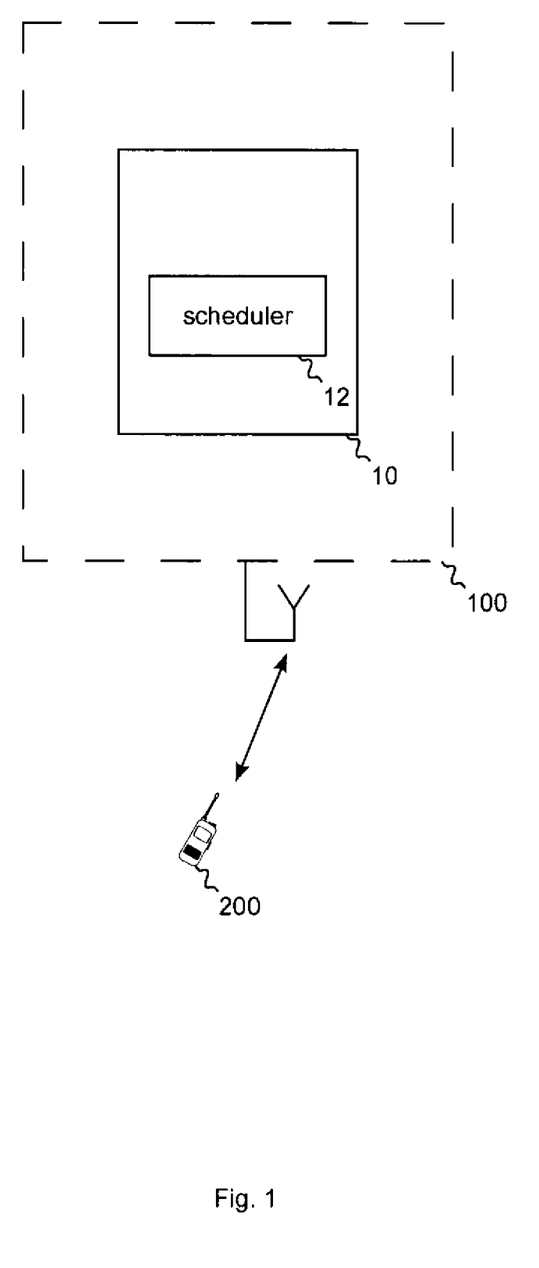
FIG. 1 shows an embodiment of an apparatus for assigning a radio resource.

FIG. 1 illustrates an apparatus 10 for a mobile communication system, which is assumed to be an LTE system. In the embodiment shown in FIG. 1 the apparatus 10 is comprised in the base station transceiver 100. It is to be noted that in some embodiments the base station transceiver 100 can be comprised of a remote unit and a central unit, as it was described above. The apparatus 10 can then be comprised in the central unit or in the remote unit. Hence, in some embodiments the base station transceiver 100 can comprise a transmission point with amplifier and antenna, e.g. as an RRH, and a central unit. The apparatus 10 with a scheduler 12 can then be located centralized at the central unit. Moreover, in some embodiments the apparatus 10 may have one or more base station transceivers, i.e. transmission points, under its control. FIG. 1 further depicts a mobile transceiver 200. The apparatus 10 is operable to assign a radio resource from a plurality of radio resources to enable communication of information between the mobile transceiver 200 and the base station transceiver 100. In FIG. 1 the base station transceiver 100 is shown in dotted lines, to indicate that the base station transceiver 100 is optional. The apparatus 10 comprises the scheduler 12 for determining the radio resource based on information on a transmission condition between the mobile transceiver 200 and the base station transceiver 100 and based on a first allocation rule of a first operator and based on a second allocation rule of a second operator.

In embodiments the first allocation rule may correspond to a quality of service indication for a communication between the mobile transceiver 200 and the base station transceiver 100 when the mobile transceiver 200 is associated with a first operator. Furthermore, the second allocation rule may correspond to a quality of service indication for a communication between the mobile transceiver 200 and the base station transceiver 100 when the mobile transceiver 200 is associated to the second operator.

Figure 2:
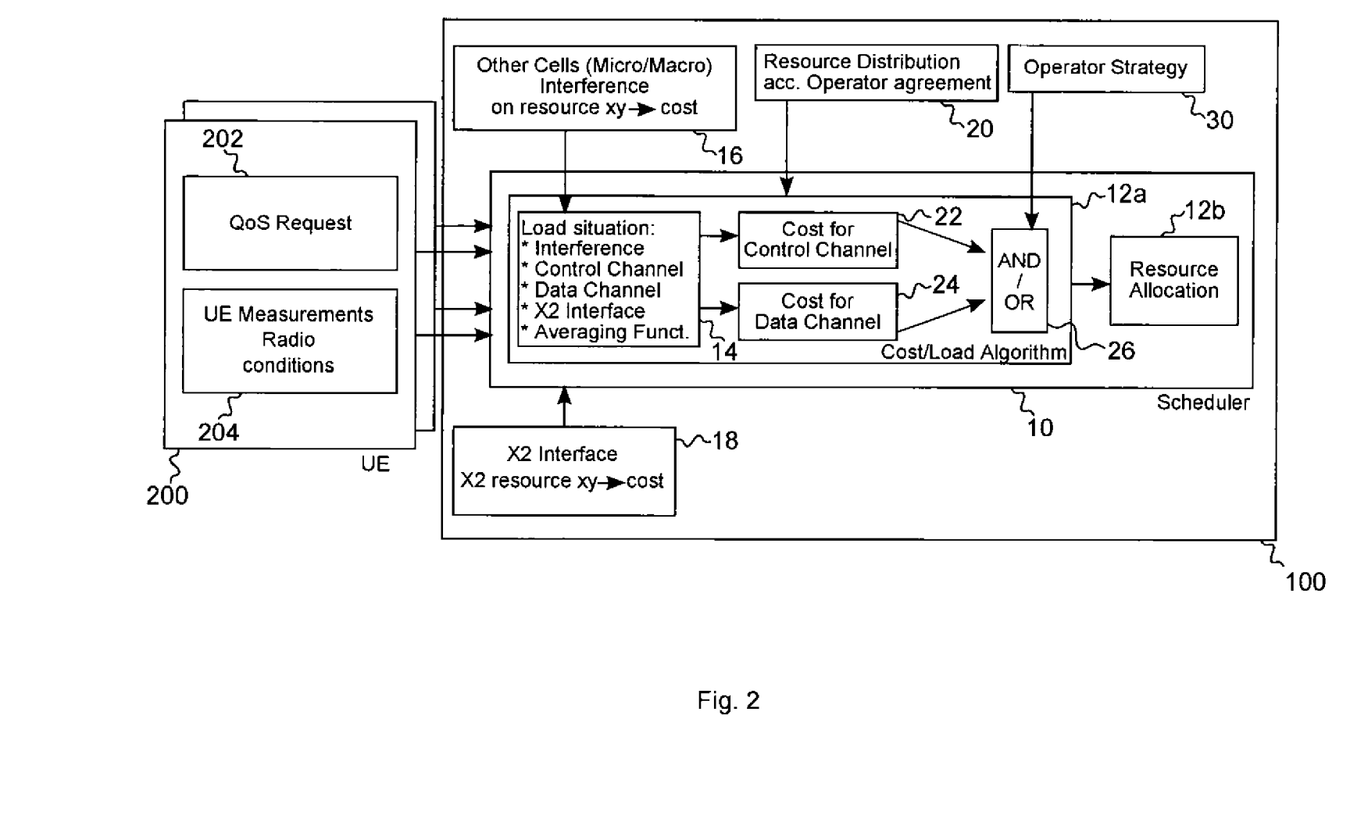
FIG. 2 illustrates an overview of an embodiment in an eNodeB.

FIG. 2 illustrates an overview of the apparatus 10 and its inputs. FIG. 2 illustrates on the left-hand side a mobile transceiver or UE 200, which has a certain quality of service request 202 and which carries out UE measurements on the radio conditions 204 between the UE 200 and the base station transceiver 100. As indicated in FIG. 2 there may be a plurality of mobile transceivers or UEs 200. FIG. 2 illustrates on the right-hand side a base station transceiver 100, which comprises the above-described apparatus 10. The apparatus 10 comprises a scheduler 12, which is in the embodiment shown in FIG. 2 separated in two different components 12a and 12b, wherein 12a carries out the evaluation of multiple input parameters, which will be detailed subsequently, and where module 12b carries out the actual resource allocation based on the outcome of module 12a. The embodiment illustrated in FIG. 2 exemplifies one setup among multiple different setups of the scheduler 12 conceivable in embodiments. In further embodiments the setup may look differently, e.g. the sequential steps, as they are described herein, may be carried out in a different order or two or more of these steps may be carried out in parallel.

The module 12a of the scheduler is further subdivided in multiple blocks, wherein the first block 14 determines the load situation. In other words, in this embodiment the determining of the radio resource is further based on a utilization of control channel resources, a utilization of data channel resources, and a utilization of communication resources to other base station transceivers at the base station transceiver 100.

Block 14 in the scheduling module 12a illustrates these parameters, which are summarized under the load situation of the base station transceiver 100. In module 14 the interference condition is also considered, as part of the information of the transmission condition, which may be at least partly determined by the UE 200. Said information on the transmission condition may comprise general information on the load situation. This information may comprise information on a quality of service requirement of a service of the mobile transceiver, information on an interference condition, information on an intercell interference condition, information on an intra-cell interference condition, information on a capacity utilization on an interface to another base station transceiver, information on a capacity utilization of the plurality of radio resources, information on a capacity utilization of radio resources of a control channel, or information on a capacity utilization of radio resources of a data channel. The scheduler 12a, 12b is operable to base the determining of the radio resource on whether the mobile transceiver 200 is subscribed to the first operator or to the second operator.

As further indicated by module 14 in FIG. 2, the load situation may also consider an average function. Hence, the scheduler 12 or its module 12a in the present embodiment is operable to determine an averaging function for a resource distribution among the first operator and the second operator. In other words, the averaging function may determine a fairness that is achieved for a predetermined time interval between the operators, considering their allocation rules. The averaging function refers to one or more elements of the group of a predetermined time window, a predetermined load, a predetermined capacity utilization on a control channel, a predetermined capacity utilization on a data channel, an average number of served mobile transceivers, or a fairness level. That is to say that certain agreements in terms of certain capacities may have been made with the operators. Fairness may be achieved, if these agreements, i.e. certain data rates or data amounts, QoS criteria, etc., are achieved. The averaging function may determine this achievement, i.e. how fair each operator was treated during a certain time window.

In other words, agreements on certain resource provisions may form a basis for the allocation rules of the operators. These may especially be taken into account in network overload situations. For example, the distribution of the control channels (PDCCH, PUCCH, RACH, PHICH, PCH) may be set or predefined within an allocation rule. For example, a certain percentage of the control channels may be assigned to operator 1 while another percentage of the control channels may be assigned to operator 2. Similar considerations may apply with respect to the data channels (PDSCH, PUSCH), for which also the associated resource capacity, i.e. frequency bandwidth allocation or allocation time duration/period can be taken into account in embodiments. That is to say, a certain percentage of a data channel may be assigned to operator 1, while another percentage may be assigned to operator 2. The percentage of a data channel may correspond to a percentage of a data channel capacity, e.g. in terms of frequency bandwidth or time duration or period, and it may be relative to the total system bandwidth or a radio frame or sub-frame duration, a Time Transmission Interval (TTI) or one or more symbol durations, etc. The averaging function for the resource distribution may periodically check the fairness targets between the operators. A time window, for example, extending to a number of milliseconds (e.g. 1 ms, 2 ms, 3 ms, 5 ms, 10 ms, or 20 ms), may serve as a basis for the evaluation of the average function. Moreover, different conditions may be considered, for example, taking into account a current load given by or carries for operator 1 or operator 2 or from both, etc.

Coming back to FIG. 2, block 16 indicates information from other cells, for example in a micro/macro scenario. Information may be provided on interference on certain resources, the cost for a transmission on these resources, respectively. In FIG. 2, block 18 represents the X2 interface of the eNodeB 100. In embodiments the X2 interface may correspond in general to the backbone of an eNodeB, a base station transceiver or a transmission point, so it may be a wireless or wired (wireline) interface to the backbone, as e.g. Common Public Radio Interface (CPRI) or X2 as known from LTE. Block 18 may indicate information on the resources utilized on the X2 interface, such that the utilization or a cost of X2 resources can also be taken into account by block 14.

In FIG. 2 block 20 indicates the resource distribution according to an operator agreement, as e.g. a Service Level Agreement (SLA) between sharing operators, or according to the allocation rule of a certain operator.

In embodiments, the information to be communicated between the mobile transceiver 200 and the base station transceiver 100 may correspond to a control signal. The control signal may be communicated as part of a control channel established between the base station transceiver 100 and the mobile transceiver 200. The control channel may comprise information related to a payload communication on a data channel.

The first and second assignment rules determine a distribution of the radio resources between the first operator and the second operator. The plurality of resources may therefore be shared among the first operator and the second operator based on the first and second allocation rules.

As further indicated in FIG. 2, the blocks 22 and 24 may determine the cost or cost indicators for a control channel 22 and for a data channel 24. The scheduler 12 is operable to determine a control cost indicator for a control channel resource related to communicating the information between the mobile transceiver 200 and the base station transceiver 100 based on a load situation of the base station transceiver 100 and based on the allocation rule of the operator the mobile transceiver 200 is associated with. As indicated by the module 24 in FIG. 2, the scheduler 12a is operable to determine a data cost indicator for a data channel resource related to communicating the information between the mobile transceiver 200 and the base station transceiver 100 based on the load situation of the base station transceiver 100 and based on the allocation rule of the operator the mobile transceiver 200 is associated with.

The scheduler 12 is further operable to determine the radio resource based on the control cost indicator and the data cost indicator. As further shown in FIG. 2, the cost indicators for the control channel 22 and the data cost indicator 24 are combined in the combining module 26, which also takes into account the operator strategy 30. That is to say, the scheduler 12 is further operable to determine the radio resource based on a cost allocation parameter of the operator the mobile transceiver 200 is associated with and the cost parameter indicates a desired resource utilization of the operator related to control and data costs. In other words, the operator may define the cost allocation parameter to be combined with the control channel costs and the data channel costs in order to determine, what resources are to be actually allocated in block 12b.

In the embodiment depicted in FIG. 2 a cost/load algorithm is introduced into the multioperator scheduler 12. In some embodiments the input parameters and values are open, i.e. available to the public. In some embodiments, they may be standardized to provide operators equal access to the scheduler 12. This may guarantee transparency in some embodiments for all involved parties, i.e. partnering/sharing operators and manufacturers. This may even help to trust into the scheduling decisions and building information generated by such a scheduler 12. In some embodiments, the cost/load algorithm itself may be proprietary to the manufacturer or the eNodeB software.

Figure 3:
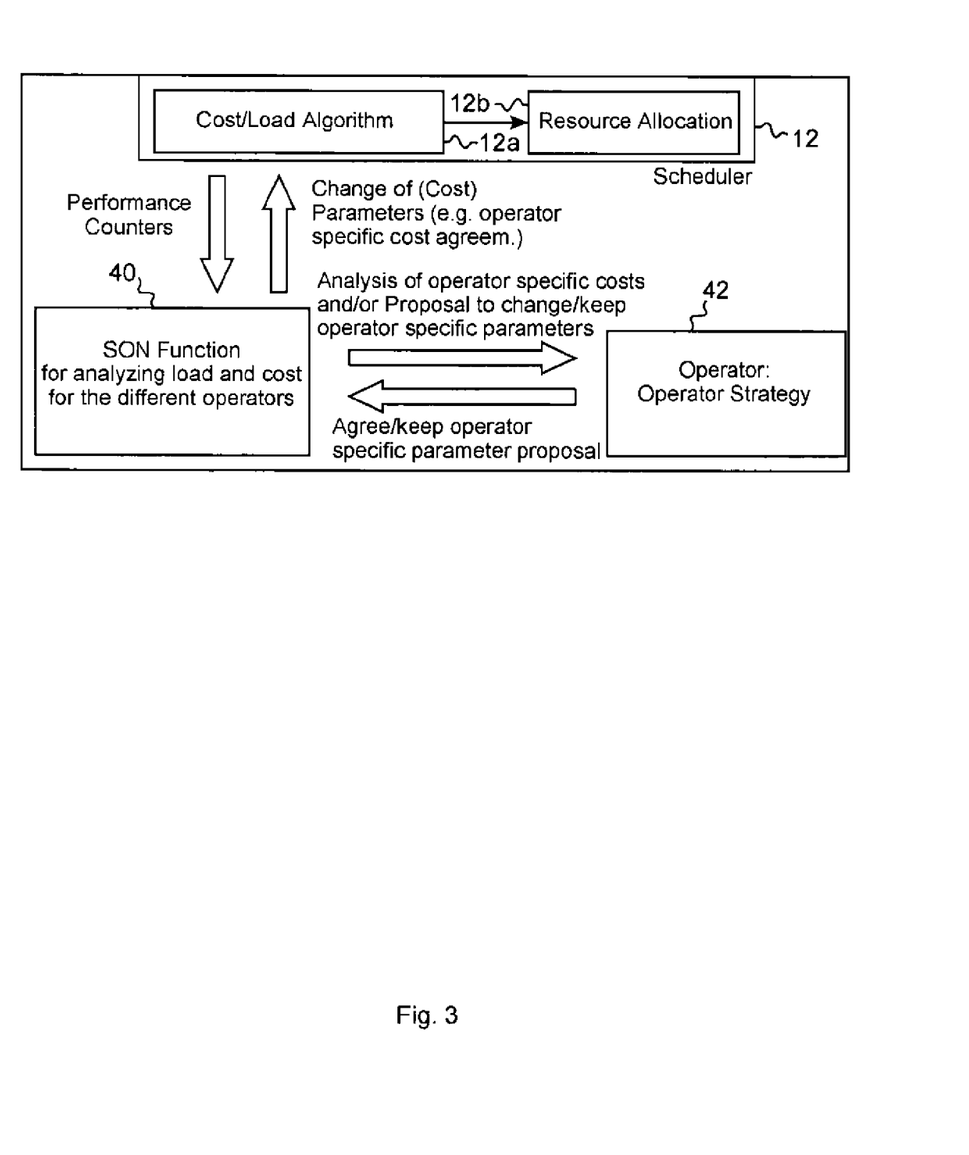
FIG. 3 illustrates an overview of an adaptation of an embodiment based on performance counters.

FIG. 3 shows another overview of the adaptation of the scheduler 12, based on information provided by the scheduler. FIG. 3 shows at the top the scheduler 12, which is comprised with the two components 12a and 12b as they have been explained in FIG. 2. The scheduler 12 is operable to determine a radio resource allocation trace comprising information on radio resource allocations for at least one of the operators and/or the mobile transceiver 200 for a predetermined time period. The radio resource allocation trace comprises information on a quality of service provided to the at least one operator and/or the mobile transceiver 200.

In the present embodiment the radio resource allocation trace is provided in terms of performance counters, which are input into a Single Operator Network (SON) function. The SON function analyzes the load and costs for different operators. The SON function is indicated by a block 40 in FIG. 3. As FIG. 3 also indicates a change of cost or parameters, for example, in an operator-specific way based on the cost agreement, may be fed back from the SON function 40 to the scheduler 12 in order to adapt allocation parameters. As can also been seen in FIG. 3, the SON function 40 provides an analysis of the operator-specific costs and/or a proposal to change/keep operator specific parameters, i.e. as for example the allocation parameters, to the operator which is indicated by block 42 in FIG. 3. The operator may then, based on its strategy, agree to proposals from the SON function 40. As indicated by the arrow pointing from the operator 42 to the SON function 40 in FIG. 3, the operator may agree/keep operator specific parameter proposals.

Embodiments may introduce a self-learning and adapting block for a more operator scheduler 12 as indicated by FIG. 3. As part of the radio resource allocation trace embodiments may analyze load and cost for specific operators and embodiments may even propose to change or keep operator-specific parameters according to performance counters reported from the scheduler 12. Embodiments may therewith provide operators with a tool to adapt their business plans per base station 100, e.g. per eNodeB 100, according to traffic structure and user distribution in a cell. Compared to a fixed frame contract, embodiments may provide a dynamic and more cost-oriented and fair billing.

Figure 4:
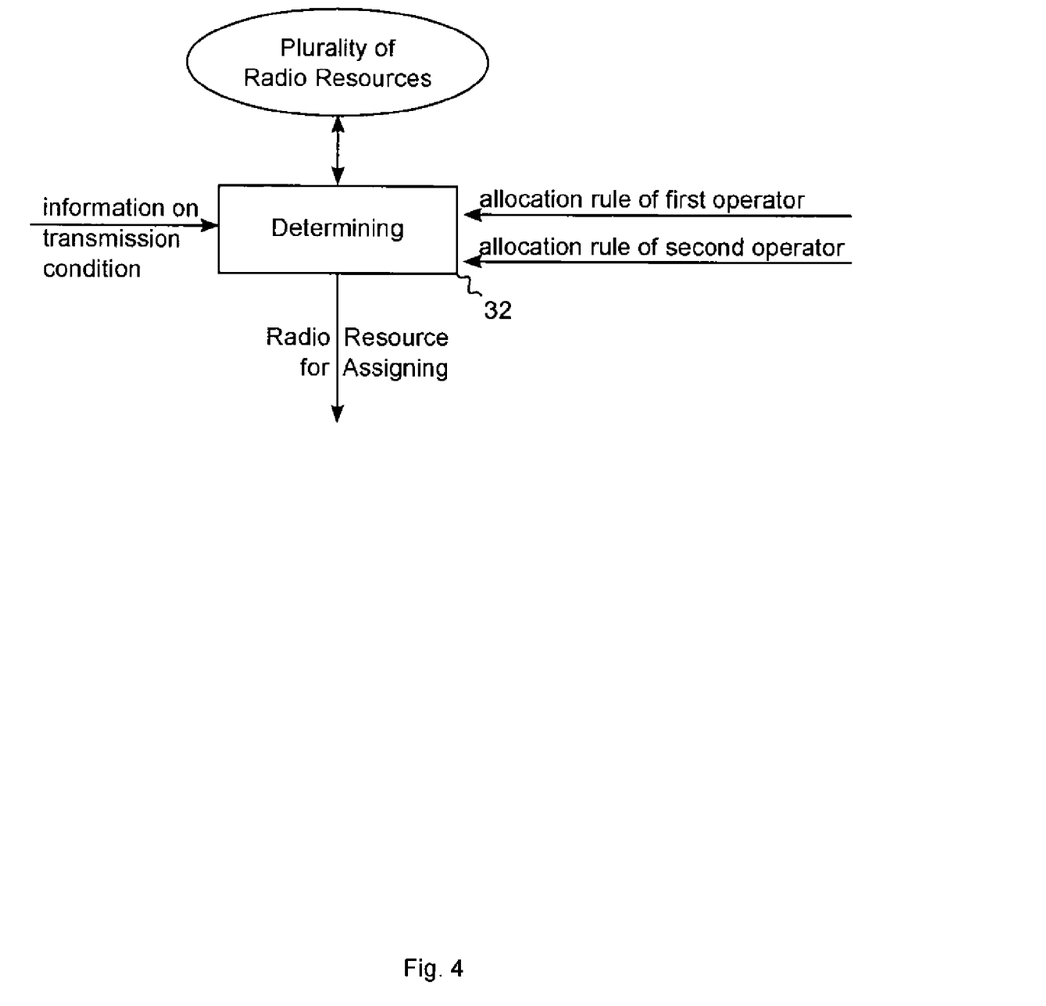
FIG. 4 shows a block diagram of a flow chart of an embodiment of a method for assigning radio resources.

FIG. 4 illustrates a block diagram of a flowchart of an embodiment of a method for a mobile communication system being operable for assigning a radio resource from a plurality of radio resources to enable communication of information between a mobile transceiver 200 and a base station transceiver 100 in a mobile communication system. The method comprises a step of determining 32 the radio resource based on information on a transmission condition between the mobile transceiver 200 and the base station transceiver 100, and based on a first allocation rule of a first operator and based on a second allocation rule of a second operator.

Embodiments may provide the advantage that spectrum sharing or sharing of hardware components may be enabled in a more efficient way. Spectrum sharing, and also a complete virtualized approach, may be enabled through a cooperating scheduler. Embodiments may make the network sharing scenario as described above more interesting for operators with new services, machine-to-machine communication, movie studios, game console providers, etc.

Embodiments may provide a further advantage that a transparency of scheduling decisions may be enabled together with a transparency of a performance of a scheduler by adapting input parameters with an open interface to operators, comparable with an application programming interface (API). Embodiments may provide the advantage that they may operate with different business plans and strategies of the operators. Compared to a fixed frame contract between operators, embodiments may provide a more dynamic and more cost-oriented and fair billing among the sharing operators. Embodiments may provide a possibility of establishing business plans per base station, i.e. operators may be enabled to adapt their scheduling strategies according to the traffic structure and user distribution in a cell, leading them to a business plan per base station transceiver, or eNodeB.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing a certain function, respectively. Hence, a "means for s.th." may as well be understood as a "means being adapted or suited for s.th.". A means being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. An apparatus for a mobile communication system, the apparatus comprising:
at least one processor and associated memory, wherein the at least one processor is configured to assign a radio resource from a plurality of radio resources for a communication of information between a mobile transceiver and a base station transceiver;
wherein the at least one processor is configured to assign the radio resource based on information on a transmission condition between the mobile transceiver and the base station transceiver, based on a first allocation rule of a first operator, and based on a second allocation rule of a second operator;
wherein the information to be communicated between the mobile transceiver and the base station transceiver corresponds to a control signal, which is communicated as part of a control channel established between the base station transceiver and the mobile transceiver;
wherein the control signal comprises information related to a payload communication on a data channel.

2. The apparatus of claim 1, wherein the at least one processor is configured to assign the radio resource based on at least one of a utilization of control channel resources, a utilization of data channel resources, and a utilization of communication resources to other base station transceivers at the base station transceiver.

3. The apparatus of claim 1, wherein the at least one processor is configured to assign the radio resource based on at least one of whether the mobile transceiver is subscribed to the first operator and whether the mobile transceiver is subscribed to the second operator.

4. The apparatus of claim 1, wherein the first and second allocation rules determine a distribution of the radio resource between the first operator and the second operator.

5. The apparatus of claim 1, wherein the at least one processor is configured to determine a control cost indicator for a control channel resource related to communicating the information between the mobile transceiver and the base station transceiver based on a load situation of the base station transceiver and based on the first or second allocation rule of the corresponding first or second operator depending on which of the first and second operators the mobile transceiver is associated with;
wherein the at least one processor is configured to determine a data cost indicator for a data channel resource related to communicating the information between the mobile transceiver and the base station transceiver based on the load situation of the base station transceiver and based on the first or second allocation rule of the corresponding first or second operator depending on which of the first and second operators the mobile transceiver is associated with;
wherein the at least one processor is configured to assign the radio resource based at least in part on the control cost indicator and the data cost indicator.

6. The apparatus of claim 5, wherein the at least one processor is configured to assign the radio resource based on a cost allocation parameter of the first or second operator depending on the corresponding operator associated with the mobile transceiver;
wherein the cost allocation parameter indicates a desired resource utilization related to control and data costs of the corresponding operator associated with the mobile transceiver.

7. The apparatus of claim 1, wherein the at least one processor is configured to determine a radio resource allocation trace comprising information on radio resource allocations for at least one of the first operator, the second operator, and the mobile transceiver for a predetermined time period.

8. The apparatus of claim 1, wherein the at least one processor is configured to determine an averaging function for a resource distribution among the first operator and the second operator.

9. The apparatus of claim 8, wherein the averaging function is associated with at least one of a predetermined time window, a predetermined load, a predetermined capacity utilization on a control channel, a predetermined capacity utilization on a data channel, an average number of served mobile transceivers, and a fairness level.

10. The apparatus of claim 1, wherein the first allocation rule corresponds to a quality of service indication for a communication between the mobile transceiver and the base station transceiver when the mobile transceiver is subscribed to the first operator;
wherein the second allocation rule corresponds to a quality of service indication for a communication between the mobile transceiver and the base station transceiver when the mobile transceiver is subscribed to the second operator.

11. The apparatus of claim 1, wherein the information on the transmission condition comprises at least one of information on a load situation, information on a quality of service requirement of a service of the mobile transceiver, information on an interference condition, information on an inter-cell interference condition, information on an intra-cell interference condition, information on a capacity utilization of an interface to another base station transceiver, information on a capacity utilization of the plurality of radio resources, information on a capacity utilization of radio resources of a control channel, and information on a capacity utilization of radio resources of a data channel.

12. A base station transceiver comprising the apparatus of claim 1.

13. The apparatus of claim 1, wherein the at least one processor is configured to determine a radio resource allocation trace comprising information on a quality of service provided to at least one of the first operator, the second operator, and the mobile transceiver.

14. A method for assigning a radio resource in a mobile communication system, the method comprising:
determining a radio resource from a plurality of radio resources for a communication of information between a mobile transceiver and a base station transceiver, wherein the radio resource is determined based on information on a transmission condition between the mobile transceiver and the base station transceiver, based on a first allocation rule of a first operator, and based on a second allocation rule of a second operator;
wherein the information to be communicated between the mobile transceiver and the base station transceiver corresponds to a control signal, which is communicated as part of a control channel established between the base station transceiver and the mobile transceiver;
wherein the control signal comprises information related to a payload communication on a data channel.

15. The method of claim 14, further comprising:
determining the radio resource based on at least one of a utilization of control channel resources, a utilization of data channel resources, and a utilization of communication resources to other base station transceivers at the base station transceiver.

16. The method of claim 14, further comprising:
determining the radio resource based on at least one of whether the mobile transceiver is subscribed to the first operator and whether the mobile transceiver is subscribed to the second operator.

17. The method of claim 14, further comprising:
determining a control cost indicator for a control channel resource related to communicating the information between the mobile transceiver and the base station transceiver based on a load situation of the base station transceiver and based on the first or second allocation rule of the corresponding first or second operator depending on which of the first and second operators the mobile transceiver is associated with;
determining a data cost indicator for a data channel resource related to communicating the information between the mobile transceiver and the base station transceiver based on the load situation of the base station transceiver and based on the first or second allocation rule of the corresponding first or second operator depending on which of the first and second operators the mobile transceiver is associated with; and
determining the radio resource based at least in part on the control cost indicator and the data cost indicator.

18. The method of claim 14, further comprising:
determining a radio resource allocation trace comprising information on radio resource allocations for at least one of the first operator, the second operator, and the mobile transceiver for a predetermined time period.

19. The method of claim 14, further comprising:
determining a radio resource allocation trace comprising information on a quality of service provided to at least one of the first operator, the second operator, and the mobile transceiver.

20. A non-transitory computer-readable medium storing program instructions that, when executed by a processor, cause a processor-controlled apparatus to perform a method for assigning radio resources in a mobile communication system, the method comprising:
determining a radio resource from a plurality of radio resources for a communication of information between a mobile transceiver and a base station transceiver, wherein the radio resource is determined based on information on a transmission condition between the mobile transceiver and the base station transceiver, based on a first allocation rule of a first operator, and based on a second allocation rule of a second operator;
wherein the information to be communicated between the mobile transceiver and the base station transceiver corresponds to a control signal, which is communicated as part of a control channel established between the base station transceiver and the mobile transceiver;
wherein the control signal comprises information related to a payload communication on a data channel.

* * * * *